United States Patent
Dietrich et al.

(10) Patent No.: US 6,370,978 B1
(45) Date of Patent: *Apr. 16, 2002

(54) APPARATUS FOR CONVERTING A ROTARY MOTION INTO AN AXIAL MOTION

(75) Inventors: Johannes Dietrich, Gilching; Bernd Gombert, Grafrath, both of (DE)

(73) Assignee: Deutsches Zentrum für Luft-und Raumfahrt e.V., Köln (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/642,285

(22) Filed: May 3, 1996

(30) Foreign Application Priority Data

May 8, 1995 (DE) .......................... 195 16 199

(51) Int. Cl.⁷ .......................... F16H 35/10; F16H 25/22
(52) U.S. Cl. .................. 74/424.92; 74/424.89
(58) Field of Search .................... 74/424.8 C, DIG. 10, 74/459, 424.8 R

(56) References Cited

U.S. PATENT DOCUMENTS

| 3,611,818 | A | * | 10/1971 | Burns et al. ........... 74/DIG. 10 |
| 4,050,319 | A | * | 9/1977 | Stanley ..................... 74/89.15 |
| 4,651,229 | A | * | 3/1987 | Coli ....................... 74/DIG. 10 |
| 4,655,100 | A | * | 4/1987 | Frederick et al. ...... 74/424.8 C |
| 4,859,394 | A | * | 8/1989 | Benton et al. ......... 74/424.8 R |
| 4,926,708 | A |   | 5/1990 | Dietrich et al. ........ 74/424.8 C |

FOREIGN PATENT DOCUMENTS

| DE | 4114082 | 2/1991 |
| DE | 9213640 | 10/1992 |
| EP | 0003802 | 2/1978 |
| EP | 0603067 | 12/1992 |
| EP | 603067 | * 6/1994 ............ 74/424.8 C |

* cited by examiner

Primary Examiner—David Fenstermacher
(74) Attorney, Agent, or Firm—Browdy and Neimark P.L.L.C.

(57) ABSTRACT

An apparatus for converting a rotary motion into an axial motion, is used as overload protection; the force transmitting elements of the conversion apparatus, in the form of a threaded spindle, a nut and/or the intervening planetary rollers and roller bodies, are made with different contours of deformable, preferably elastically deformable material.

13 Claims, 2 Drawing Sheets

APPARATUS FOR CONVERTING A ROTARY MOTION INTO AN AXIAL MOTION

FIELD OF THE INVENTION

The invention relates to a use of an apparatus for converting a rotary motion into an axial motion or vice versa.

DESCRIPTION OF THE RELATED ART

FIGS. 1a and 1b show, in section and plan view respectively, a spindle 1, which by way of example may be the end of a drive motor shaft. Provided on the spindle 1 is preferably a simplex fine thread 10, which in turn has a pitch S of 0.3 to 0.25 mm or less.

Also, a number of rollers or roller bodies 3a–3f, for instance six, which are shown in FIG. 1a in section and in FIG. 1b in plan view, are disposed in the mounted state of the spindle arrangement in planetlike fashion between the spindle 1 and a nut 2. A correspondingly finely embodied groove contour 31, comprising grooves of a certain spacing extending next to one another and parallel, is also provided on predetermined segments on the rollers or roller bodies 3a–3f. The groove contour 31 facing toward the spindle 1 that will hereinafter be called the spindle-side contour. Because of this constant groove spacing and the groove depth, an exact engagement with the thread 10 of small pitch on the spindle 1 is assured.

Between the segments formed on the individual rollers or roller bodies 3a–3f, coarse guide grooves 32 of V-shaped cross section are also formed, which will hereinafter be called the nut-side contour. The spacing of the guide grooves 32 is exactly the same as that of guide grooves 20, which are formed in the interior of the spindle nut 2. The guide grooves 20 are also of V-shaped cross section, and mate with the guide grooves 32 of the roller or roller bodies 3 (i.e., 3a–3f).

In order that all the rollers or roller bodies 3 will mesh exactly and reliably both with the nut-side groove contour of a certain spacing in the interior of the nut 2 and with the spindle 1 of small thread pitch, the spindle-side groove contour 31 on each of the planetary rollers is disposed with a specific pitch offset that is constant from roller to roller and is fixed as a function of the total pitch to be attained.

In this way the rollers or roller bodies 3a–3f in the intended intermediate segments each has a different pitch offset, with respect to the fine contour 31. The rollers 3 must therefore be disposed in a very specific order, to which end a suitable identification is provided on individual rollers 3, for instance on the face end.

When the pitch of the fine thread on the spindle 1 is 0.3, for instance and with a corresponding spacing of the groove pitch, this would mean a pitch offset or displacement of 0.05 mm from one roller to another, or expressed in degrees, 60° of angle between each pair of the six illustrated rollers 3a–3f. Or expressed in another way, when counting begins at a certain roller, the pitch offset of the contour 31 of the nth roller is equal to the product of the (number of the particular roller of interest −1)×360°/total number of rollers.

In an alternate, second embodiment, the planetary rollers are provided with a thread of positive or negative pitch and the spindle is analogously provided with grooves. The nut-side guide grooves of the rollers and the corresponding guide grooves of the nut remain as described above. However, in the second embodiment a cage is necessary that keeps the planetary rollers spaced apart angularly from one another.

Such an apparatus for converting a rotary motion into an axial motion is described in U.S. Pat. No. 4,926,708, the contents of which are incorporated herein by reference.

SUMMARY OF THE INVENTION

According to the invention, such an apparatus for converting a rotary motion into an axial motion and vice versa is used for overload protection.

In accordance with an advantageous further feature of the invention, the apparatus used for converting a rotary motion into an axial motion is further embodied such that the force transmitting elements, namely the threaded spindle, the nut and/or the rollers or roller bodies having the various contours are made from deformable, preferably elastically deformable material. The elastically deformable material of the force transmitting elements is preferably polymer material or suitable deformable or elastically deformable materials.

Thus if in the known apparatus for converting a rotary motion into an axial motion the force transmitting elements, especially the rollers or roller bodies with the different contours, are made of deformable or elastically deformable material, such as a polymer and the like, a system pitch change dependent on the load is obtained that can be used and exploited as overload protection. Such a system pitch change can also be established not only as a function of load but also via the rpm and the prestressing of the entire spindle system. This in turn means that if there is major prestressing in the low rpm, a greater force transmission results, with attendant major protection against overload.

BRIEF DESCRIPTION OF THE DRAWING

The above and other objects and the nature and advantages of the present invention will become more apparent from the following detailed description of an embodiment [s] taken in conjunction with drawings, wherein:

Shown in the drawings are:

FIG. 1a, sectional views of the essential elements of an embodiment of an apparatus for converting a rotary motion into an axial motion;

FIG. 1b, partly in plan view and partly in the form of a sectional view, the same elements of the embodiment shown in FIG. 1a.

DETAILED DESCRIPTION OF THE INVENTION

Figure 1:
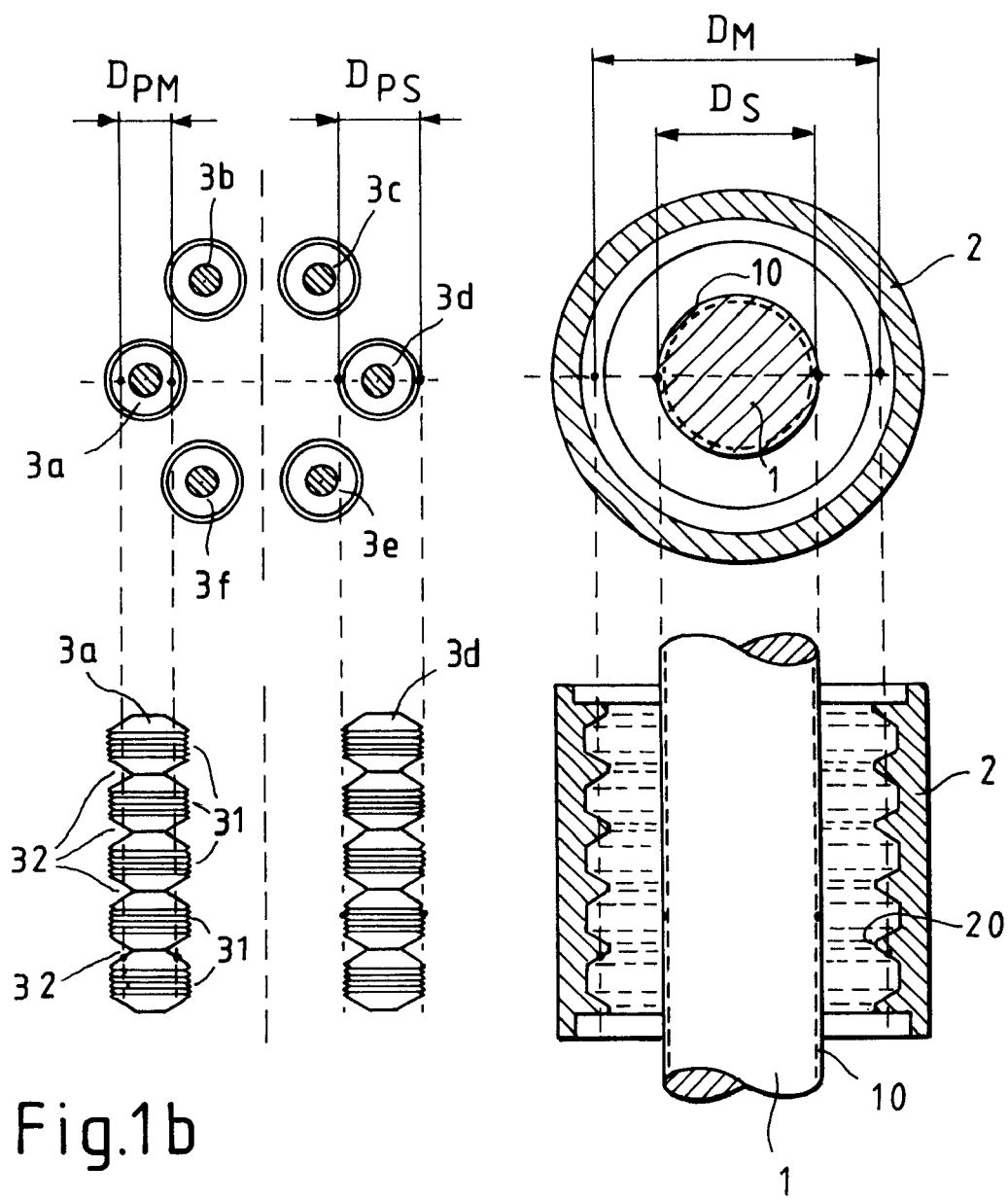

In the apparatus for converting a rotary into an axial motion the spindle 1 is rotated counter to the nut 2, then its thread 10 rolls along inside the threads of the rollers 3a, which in turn with their peripheral grooves 32 roll along the lands of the nut 2. The contouring of the spindle and the rollers creates a forward thrust, whose magnitude depends on the characteristic geometry of the roller spindle drive.

In order to be able to use the apparatus as overload protection, one or more elastic transmission elements are used in the present invention. Then, because of load-dictated elastic deformation, the rolling geometry of the spindle 1, rollers 3 and/or nut 2 varies. The thus-varied geometrical data (or, geometry) directly affect the total pitch of the roller spindle drive, as can be clearly seen from the pitch change in FIG. 2, which will later be described in detail.

The spindle-side contour 31 of the rollers or roller bodies 3 that are disposed in planetary fashion around the spindle 1 will vary with the axial force between the spindle 1 and the nut 2 (overloading force). This variation can be embodied either in the form of a thread pitch ($S_P=S_S$; $S_P=-S_S$) or as a groove contour ($S_P=0$, without pitch) where $S_S$ designates the spindle pitch and $S_P$ designates the pitch of the planetary roller bodies.

For example, if the rollers 3 are of elastic polymer, then axial stress will deform each of them, causing each groove contour 31 adjacent to the nut 2 to be displaced axially, or offset, relative to the axial position of the same groove contour 31 on the opposite side of the roller 3, where that groove contour 31 engages the thread 10 of the spindle 1. This offset tilts each contour groove 31, creating a virtual pitch $S_P$.

The total pitch $S_{ges}$ is dependent on the rolling circle diameters $D_M$ of the nut 2 and $D_S$ of the spindle S, on the spindle-side rolling circle diameters $D_{PS}$ of the rollers or roller bodies, on the nut-side rolling circle diameters $D_{PM}$ of the rollers or roller bodies, and on the pitches $S_S$ and $S_P$, and can be expressed as follows:

$$S_{ges} = \frac{\frac{D_{PS}}{D_S}S_S + S_P}{\frac{D_{PM}}{D_M} + \frac{D_{PS}}{D_S}}$$

Figure 2:
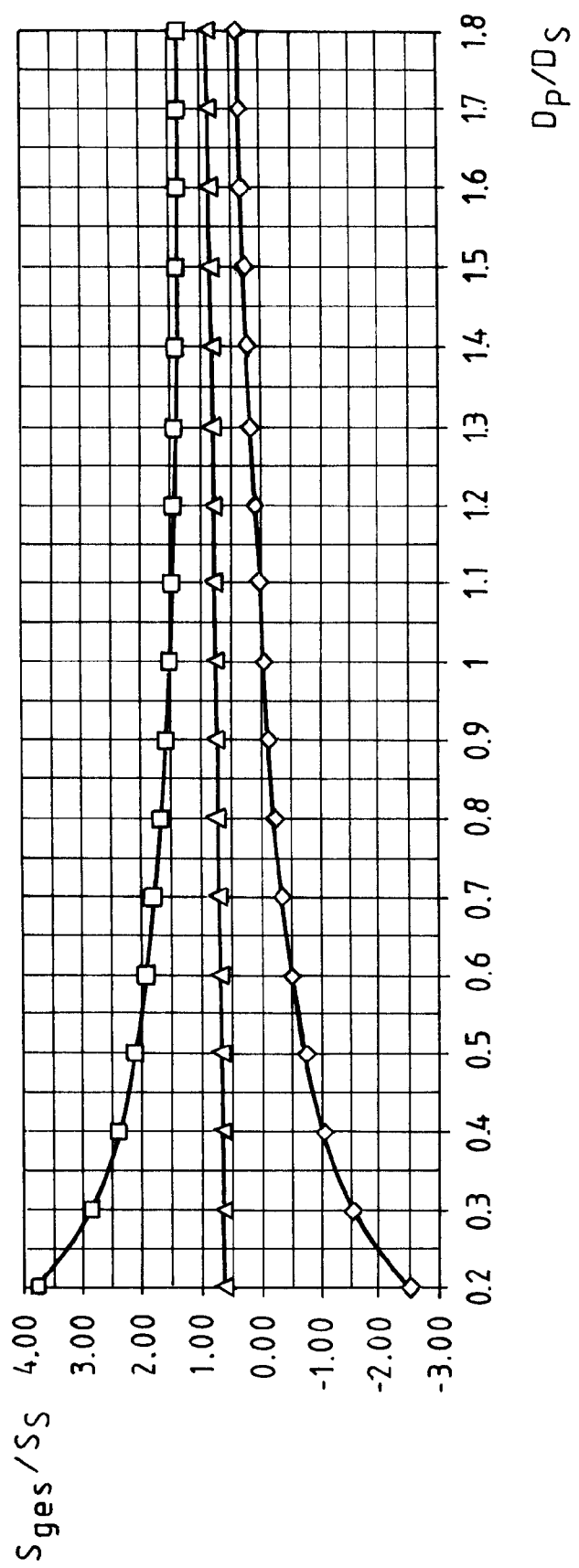
FIG. 2, a diagram in which changes in pitch for various thread pitches of the rollers are shown.

Especially in an embodiment in which the pitches of the spindle and of the rollers or roller bodies are the same, that is, $S_P=S_S$, the overload protection becomes pronounced, as can also be seen from the diagrams in FIG. 2. Letting $D_P=(D_M-D_S)/2$, if $D_P/D_S=1$ (one), the total pitch of the apparatus for converting a rotary into an axial motion is zero (0). However, this also applies for all the other three possible embodiments of the apparatus for converting rotary into axial motion with an arbitrary total pitch.

In the diagram in FIG. 2, on the ordinate, the total pitch $S_{ges}$ is plotted over the pitch $S_S$, and plotted on the abscissa is the quotient of the rolling circle diameters $D_P$ and $D_S$, that is, $D_P/D_S$. A zero line is also shown as a heavy solid line, at the point on the ordinate marked 0.00. The graph beginning approximately at the ordinate value of 4.00, with rectangles entered at regular intervals, indicates a pitch ratio $S_{ges}/S_S$ if $S_P=S_S$. The graph beginning below the ordinate value of 1.00, with triangles entered at regular intervals, applies to a pitch ratio $S_{ges}/S_S$ at which the pitch $S_P$ of the planetary rollers or roller bodies 3 is zero (0), or in other words $S_P=0$.

The graph beginning in the diagram at the ordinate value above −3.00, with diamonds plotted at regular intervals, applies to a pitch ratio at which the spindle pitch $-S_S$ is equal to the planetary roller pitch $S_P$; that is, $S_P=-S_S$.

In the diagram of FIG. 2, the above-described graphs with the diamonds entered at regular intervals describe a variable, load-dependent system pitch change, since the lower graph (with the diamonds plotted at regular intervals), beginning at a negative drive (beginning at the ordinate value −3.00), intersects the zero line of the ordinate at an abscissa value of one and then changes over to a positive drive.

Under a relatively heavy load, this variable load-dependent system pitch change thus means a zero pitch (that is, a standstill in terms of drive) and after that a reversal of direction.

The pitch of the spindle system is accordingly zero if the two rolling diameters are of equal magnitude ($D_P/D_S=1$) as a result of an excessive increase in load. This operating principle is designated in the application as overload protection.

What is claimed is:

1. In an apparatus for converting at least one of (1) rotary motion into axial motion and (2) axial motion into rotary motion, comprising:

a threaded spindle, an internally contoured nut surrounding the threaded spindle and capable of rotating relative to said spindle, and having a number of interposed contour rollers, wherein the threaded spindle has a fine thread on an outside surface thereof, the interior contour of the nut being rotatable relative to the spindle and comprising a groove which is relatively course compared to the fine thread of the threaded spindle, said rollers having two differing contours on alternating sections whereby one contour fits the thread of the spindle and another groove contour corresponds to the relatively course grooves of the interior of said nut, the improvement wherein at least one of said threaded spindle, said nut and said contour spindle rollers is of an elastically deformable polymer material, at least on e said spindle, nut and rollers comprise means whereby, during operation when variable rolling circle diameters Dp and Ds are equal, linear motion of the apparatus is at a standstill, and at least one of said spindle, nut and rollers comprises means whereby, during operation after standstill (Dp=Ds) and increased load, when a nut-side rolling circle diameter Dpm and spindle-side rolling diameter Dps are greater then a rolling circle diameter of the spindle Ds, an initial linear rotation of the apparatus is reversed.

2. An apparatus according to claim 1 wherein said rollers comprise said elastically deformable polymer material.

3. The apparatus according to claim 2 wherein said contour rollers comprised of said elastically deformable polymer material constitute means for permitting a load-dependent system pitch change Sges/Ss when either said nut or said spindle is rotated.

4. The apparatus according to claim 1, wherein at least one of said spindle, nut and rollers comprise means whereby, during operation when a ratio of total pitch Sges and spindle pitch $S_s$ of the apparatus is zero, linear motion of the apparatus is at a standstill.

5. An apparatus for converting a rotary motion into an axial motion or vice versa as overload protection, said apparatus comprising a threaded spindle (1) multiplex, a contour of a nut (2) surrounding the threaded spindle (1) embodied in a form of relatively coarse grooves (20), and a plurality of roller bodies (3a–3f) disposed between the threaded spindle (1) and the nut (2), each of said plurality of roller bodies having at least two contours, wherein a first contour of said two contours (31) fits the thread of the spindle and a second contour (32) of said two contours fits the relatively coarse grooves (20), the threaded spindle (1), the nut (2) and the plurality of roller bodies (3a–3f) all being made from material having substantial elastic deformability, and forming force transmission elements which convert a rotary motion into an axial motion or vice versa, wherein said force transmission elements comprise means for attaining a load-dependent system pitch change Sges/Ss, wherein said force transmission elements comprise means whereby, during operation when variable rolling circle diameters Dp and Ds are equal, linear motion of the apparatus is at a standstill, and further wherein said force transmission elements comprise means whereby, during operation after standstill (Dp=Ds) and increased load, when a nut-side rolling circle diameter Dpm and spindle-side rolling diameter Dps are greater than a rolling circle diameter of the spindle, an initial linear rotation of the apparatus is reversed.

6. The apparatus according to claim 5, wherein said force transmission elements comprise means whereby, during operation when a ratio total pitch Sges and spindle pitch Ss of the apparatus is zero, linear motion of the apparatus is at a standstill.

7. The apparatus according to claim 5 wherein said threaded spindle has a simplex thread.

8. The apparatus according to claim 5 wherein said threaded spindle has a multiplex thread.

9. The apparatus of claim 5, wherein by the provision of the force transmission elements (1, 2, 3a–3f) being made entirely of said elastically deformable material a suitable pitch change Sges/Ss is established during rotation of said nut relative to said spindle and by prestressing the spindle system.

10. The apparatus of claim 5, in which the elastically deformable material of the force transmission elements (1, 2, 3a–3f) is a polymer material.

11. An apparatus for converting rotary motion into axial motion or vice versa, comprising a threaded spindle, an internally contoured nut surrounding the threaded spindle and capable of rotating relative to said spindle, and a plurality of interposed contour rollers, wherein the threaded spindle (1) has a fine thread (10) on an outside surface thereof, the interior contour of the nut (2) which rotates relative to the spindle having relatively coarse grooves (20), the rollers (3a to 3f) having two contours (31; 32) on alternating sections whereby a first contour (31) of said two contours fits the fine thread (10) on the spindle (1) and a second contour (32) of said two contours corresponds to the relatively coarse grooves (20) in the interior of the nut (2), wherein the first contour (31) produces an axial connection with the fine thread (10) on the spindle (1), and the second contour (32) produces an axial connection with the coarse groove (20) on the interior of the nut (2), the improvement comprising each of the plurality of interposed contour rollers being made of a non-metallic elastically deformable material which provides a load-dependent system pitch change Sges/Ss, wherein said rollers comprise means whereby, during operation when variable rolling circle diameters Dp and Ds are equal, linear motion of the apparatus is at a standstill, and further wherein said rollers comprise means whereby, during operation after standstill (Dp=Ds) and increased load, when a nut-side rolling circle diameter Dpm and spindle-side rolling diameter Dps are greater than a rolling circle diameter of the spindle, an initial linear rotation of the apparatus is reversed.

12. The apparatus of claim 11 in which the elastically deformable material is a polymer material.

13. The apparatus according to claim 11, wherein said rollers comprise means whereby, during operation when a ratio of total pitch Sges and spindle pitch $S_s$ of the apparatus is zero, linear motion of the apparatus is at a standstill.

* * * * *